United States Patent [19]
Otsuka et al.

[11] Patent Number: 6,065,010
[45] Date of Patent: May 16, 2000

[54] COMPUTER IMPLEMENTED METHOD OF GENERATING VIRTUAL FILES FOR SHARING INFORMATION OF PHYSICAL INFORMATION FILE

[75] Inventors: Masato Otsuka, Novato, Calif.; Seiji Uchiyama, Chiba, Japan

[73] Assignee: Daikin US Corporation, Novato, Calif.

[21] Appl. No.: 08/873,101

[22] Filed: Jun. 10, 1997

[51] Int. Cl.[7] .................................................. G06F 12/08
[52] U.S. Cl. .............................. 707/101; 707/6; 707/102; 711/202; 711/203; 711/206; 711/208; 395/385
[58] Field of Search ................................. 395/385; 707/6, 707/101, 102; 711/206, 202, 203, 208

[56] References Cited

U.S. PATENT DOCUMENTS

| | | | |
|---|---|---|---|
| 4,571,700 | 2/1986 | Emry, Jr. et al. | 707/101 |
| 4,731,734 | 3/1988 | Gruner et al. | 395/385 |
| 5,479,627 | 12/1995 | Khalidi et al. | 711/202 |
| 5,555,388 | 9/1996 | Shaughnessy | 711/203 |
| 5,617,554 | 4/1997 | Alpert et al. | 711/208 |
| 5,684,986 | 11/1997 | Moertl et al. | 707/102 |
| 5,706,461 | 1/1998 | Branstad | 711/203 |
| 5,724,538 | 3/1998 | Morris et al. | 711/206 |
| 5,754,844 | 5/1998 | Fuller | 707/6 |
| 5,784,707 | 7/1998 | Khalidi et al. | 711/206 |

*Primary Examiner*—Paul R. Lintz
*Assistant Examiner*—Jean R. Homere
*Attorney, Agent, or Firm*—Wagner, Murabito & Hao

[57] ABSTRACT

A computer implemented method for generating virtual files to provide more flexibility and efficiency in the sharing of data within a physical information file. In a computer system, a large physical file contains many separate data portions that need to be shared. In one case, the data portions can correspond to video and audio information of multi-media scenes. An application can need to jump within the physical file from scene to scene when composing user interactive multi-media applications, such as storybook applications. The present invention provides a mechanism allowing a user to define a virtual file containing certain data portions of the physical file. The user inputs an offset value representing a byte offset from the start of the data portion in the physical file and also the size of the data portion is input. The offset value, the size and the file name of the virtual file is recorded into an index file. This can be performed for a number of virtual files thereby constructing a number of index files. For each index file, the computer system then generates a file entry representing the virtual file. The file entry contains a file name of the virtual file and a physical location on disk of where the virtual file exists. The offset value is translated into a physical location for each virtual file. The operating system of the computer then accesses the virtual file in the conventional manner as any other disk file is accessed to efficiently access the associated data portion within the physical file.

15 Claims, 14 Drawing Sheets

COMPUTER IMPLEMENTED METHOD OF GENERATING VIRTUAL FILES FOR SHARING INFORMATION OF PHYSICAL INFORMATION FILE

BACKGROUND OF THE INVENTION

1. Field of the Invention

The present invention relates to the field of data sharing in computer systems. More specifically, the present invention relates to the field of providing increased flexibility and efficiency with respect to the sharing of data located in a physical information file using virtual files and can be used in the field of authoring multi-media applications.

2. Related Art

In the field of multi-media computer applications, it is often necessary for a software developer to access data stored in a physical information file. FIG. 1A illustrates the contents of an exemplary physical information file ("physical file") 80 used by a software developer. The physical file 80 is stored in a disk media (e.g., hard disk or optical disk) and accessed by a disk subsystem and includes multiple separate individual data and/or multiple separate groups of data. In the case of multi-media computer applications, the data can represent different video scenes with accompanying audio information; the scenes make up a multi-media audio/visual work. For instance, scene 1, scene 2, and scene 3 of the physical file 80 represent separate data 81, 82 and 83, respectively, while screen 45 and 46 represent separate data 85 and 86, respectively. Groups of data represent groups of scenes, e.g., scene1–scene4.

In many computer applications, including multi-media authoring systems, a software developer may want to access many separate scenes or groups of scenes from physical file 80 in random or non-sequential orderings. For instance, when generating a user interactive or "storybook" application, the order the scenes are accessed and presented depends on user selections. Therefore, when generating the possible scene presentation orders, the software developer may need to, ahead of time, access the scene information in non-sequential orders anticipating the possible user selections, e.g., scene 45 accessed, then scene n accessed, then scene 1 accessed, etc.

However, in conventional computer systems, information within the physical file 80 is not shared piecemeal but rather the entire physical file 80 is made available to an application at once. For instance, FIG. 1B illustrates a prior art file sharing methodology 30 using "symbolic link" sharing. In this type of sharing, two different applications 14 and 16 can share the data of the same physical file 80 without copying the data. A symbolic link information 12 is established linking the physical file 80 to both "file_name1" and also "file_name2." Application 14 accesses the data of physical file 80 using file name "file_name1" while application 16 accesses the data of physical file 80 using file name "file_name2." It is appreciated that data from physical file 80 is not copied, but is rather shared between application 14 and application 16. One way to conceptualize this type of sharing is to image a separate logical file 20 (called "file_name1") established for application 14 and a separate logical file 22 (called "file_name2") established for application 16. Neither of logical files 20 and 22 contain their own data, rather each obtains its data from the physical file 80.

Data sharing using the symbolic link methodology 30 can occur when using a tree directory. FIG. 1C illustrates a directory tree 45 maintained in a computer system for locating data in a disk subsystem and includes a root directory 50. FIG. 1C illustrates that file_name1 60 and file_name2 70 can exist at different locations in the directory tree 45. For instance, file_name1 60 is within directory branch 55 while file_name2 70 is within directory branch 65. In this case, file_name1 60 and file_name2 70, while pointing to the same physical file 80, actually have different names for it but share the same data.

Data sharing using the symbolic link methodology 30 of FIG. 1B is not advantageous for software developers because it provides no flexible mechanism for sharing only a single piece of data or group of data (e.g., a portion) within a physical file 80. Refer to FIG. 1A again. If the software developer only needs access to scene 45 data, then using symbolic link sharing, the entire physical file 80 needs to be opened and then searched down into until scene 45 is reached and then subsequently accessed. This inefficient searching and accessing process must be repeated each and every time a new scene or group of scenes is needed by the software developer from the physical file 80. When authoring multi-media applications, especially user interactive multi-media applications, accesses from one scene to another must be made very fast and made over and over in repetition. In this case, symbolic link sharing is much too inefficient and inflexible for practical use in the task of sharing separate files or group of separate files from a physical file 80. Therefore, what is needed is a system that allows separate data and data groups within a physical file 80 of a computer system to be flexibly and efficiently shared without copying data and that avoids the inefficient searching and accessing required of symbolic link sharing of the entire physical file 80.

Accordingly, the present invention provides a system that allows separate data and data groups within a physical file 80 of a computer system to be flexibly and efficiently shared without copying data and avoiding the inefficient searching and accessing required of symbolic link sharing. The present invention provides a system allowing efficient and flexible sharing of data and data groups that is particularly useful for multi-media applications. The present invention provides a system allowing efficient and flexible sharing of data and data groups that is particularly useful for user interactive multi-media applications. These and other advantages of the present invention not specifically mentioned above will become clear within discussions of the present invention presented herein.

SUMMARY OF THE INVENTION

A computer implemented method and system are described for generating virtual files which provide more flexibility and efficiency in the sharing of data within a physical information file within a computer system environment. In a computer system, a large physical file can contain many separate data and data groups (e.g., data portions) that need to be shared by applications. In one case, the data can correspond to video and audio information of multi-media scenes, but within the scope of the present invention the data can be any type of data. In multi-media applications, it is often necessary for an application of the computer system to jump within the physical file from scene to scene when composing user interactive multi-media applications, such as storybook applications. The present invention provides a mechanism for allowing a user to define a virtual file containing certain data and/or data groups (data portions) of the physical file. The user inputs an offset value representing a byte offset from the start of the data or group of data in the physical file and also input is the size of the data or group of data. The offset value, the size and the file name of the virtual file are recorded into an index file. This can be performed for a number of virtual files thereby constructing a number of index files stored within a main index directory. For each index file of the main index directory, the computer system then generates a file entry representing the virtual file. The file entry contains a file name of the virtual file and a physical location on disk of where the virtual file exists. The offset value is translated into a physical location for each virtual file.

When used by an application, the operating system of the computer accesses the virtual file of the present invention in the conventional manner as any other disk file is accessed. This causes only the shared portion of the virtual file to be accessed by the computer system, not the entire physical file. This advantageously avoids the need to search through the entire physical file for the data portion desired.

More specifically, in a computer system having a disk subsystem for accessing data stored on a disk media, an embodiment of the present invention includes a computer implemented method of sharing data of said disk media, the method comprising the steps of: a) receiving a user-selected data portion of a physical information file, the data portion to be shared by a virtual file and defined by an address offset value from the top of the physical information file, the size of the shared data portion and a user-selected file name for the shared data portion; b) generating a respective index file in the disk media for the shared data portion, step b) comprising the steps of: b1) writing the offset value, the size and the file name of the shared data portion into the respective index file; and b2) writing an indication of the physical information file into the respective index file; c) creating a plurality of respective index files by performing steps a) and b) for a plurality of respective shared data portions of the physical information file; and d) creating a respective virtual file for each respective index file by generating a respective file entry for each respective index file, step d) comprising the steps of: d1) translating the offset value of each respective index file into a physical location in the disk media of the shared data portion of each respective index file; and d2) recording the physical location of the shared data portion and the file name of each respective index file into the respective file entry, wherein steps d1) and d2) are repeated for each respective index file. The virtual files created above can then be used in conventional disk subsystems using conventional disk accessing methods for efficiently accessing the shared data of the physical file.

DETAILED DESCRIPTION OF THE INVENTION

In the following detailed description of the present invention, an efficient and flexible mechanism for sharing data and groups of data within a physical file using virtual files, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

COMPUTER SYSTEM 112

Figure 1A:
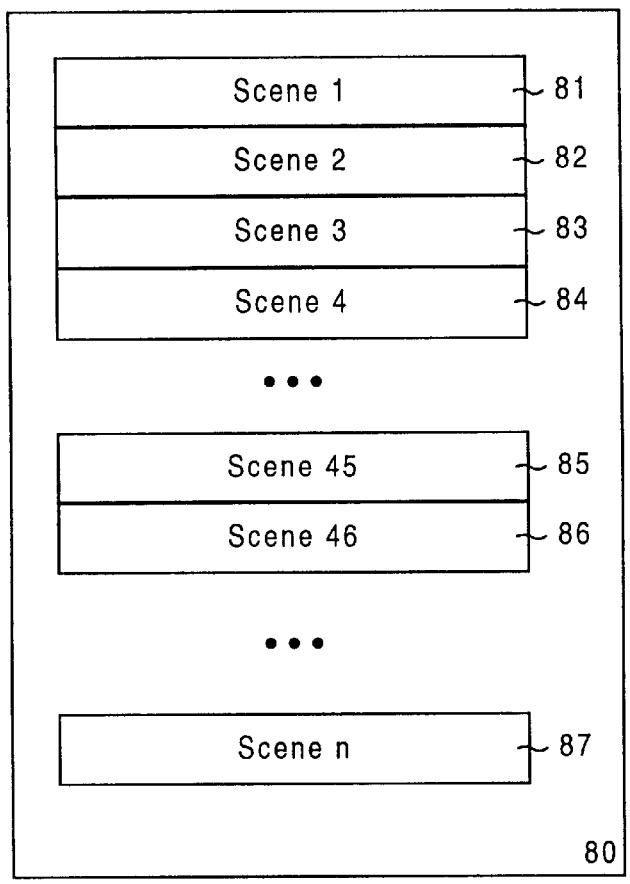
FIG. 1A illustrates a physical file stored in a computer system and the physical file contains many separate data and data groups.
Figure 1B:
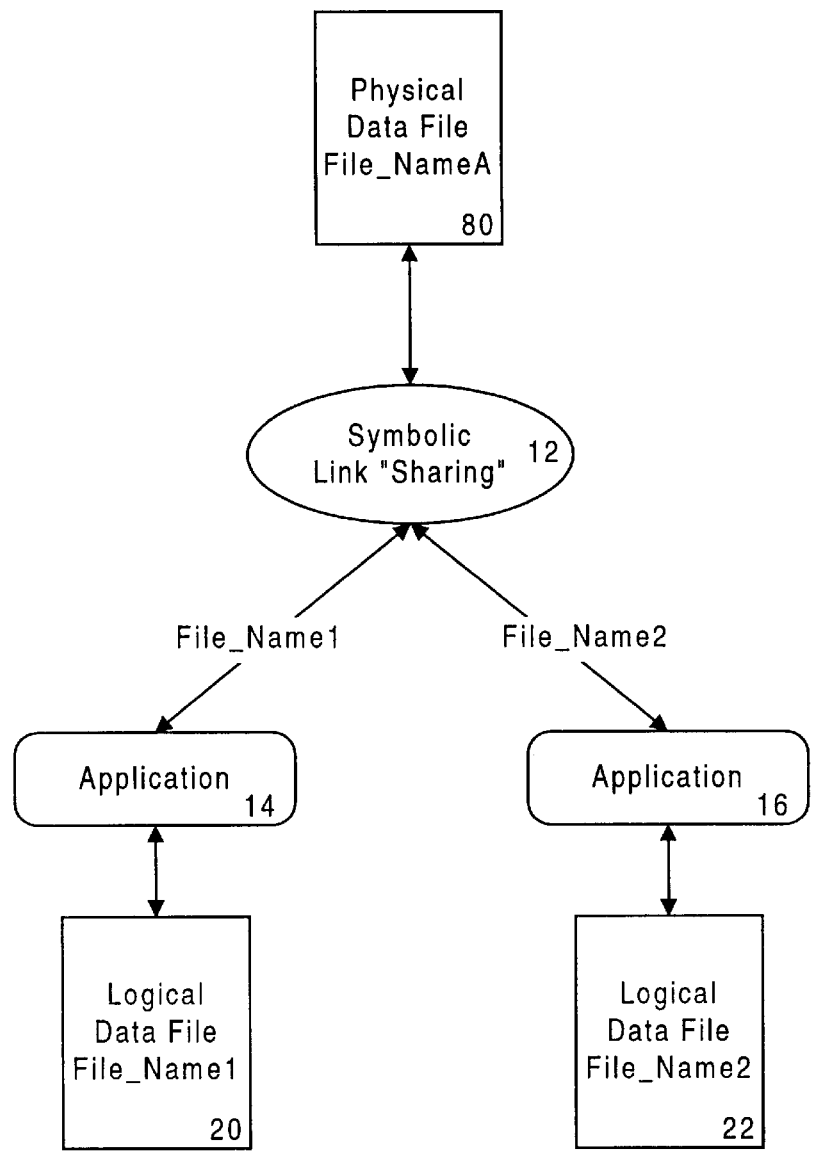
FIG. 1B illustrates a prior art file sharing methodology using a symbolic link where one physical file is called by two different names.
Figure 1C:
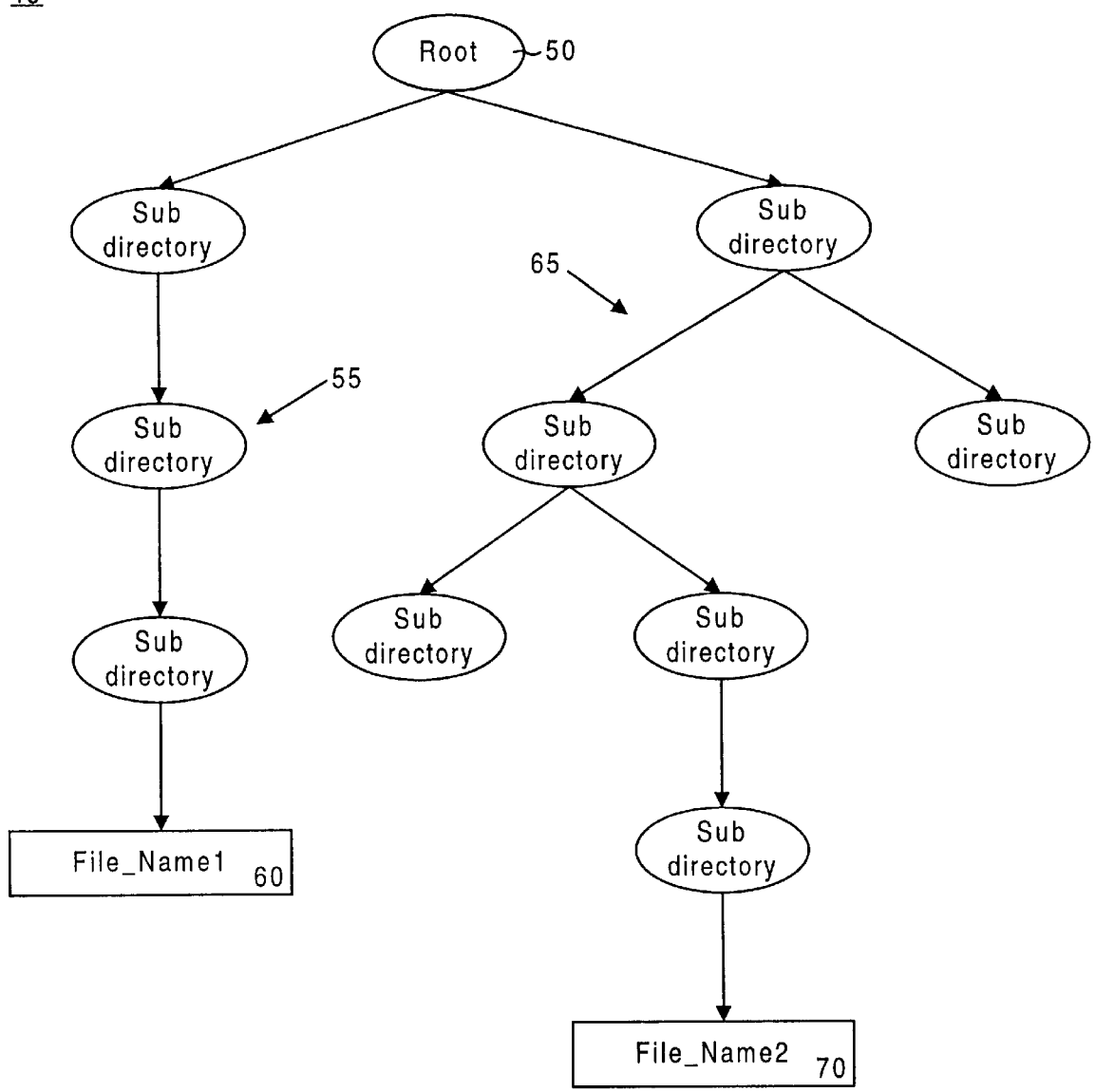
FIG. 1C illustrates a prior art directory tree structure where different names of a single physical file are located in different tree positions.
Figure 2:
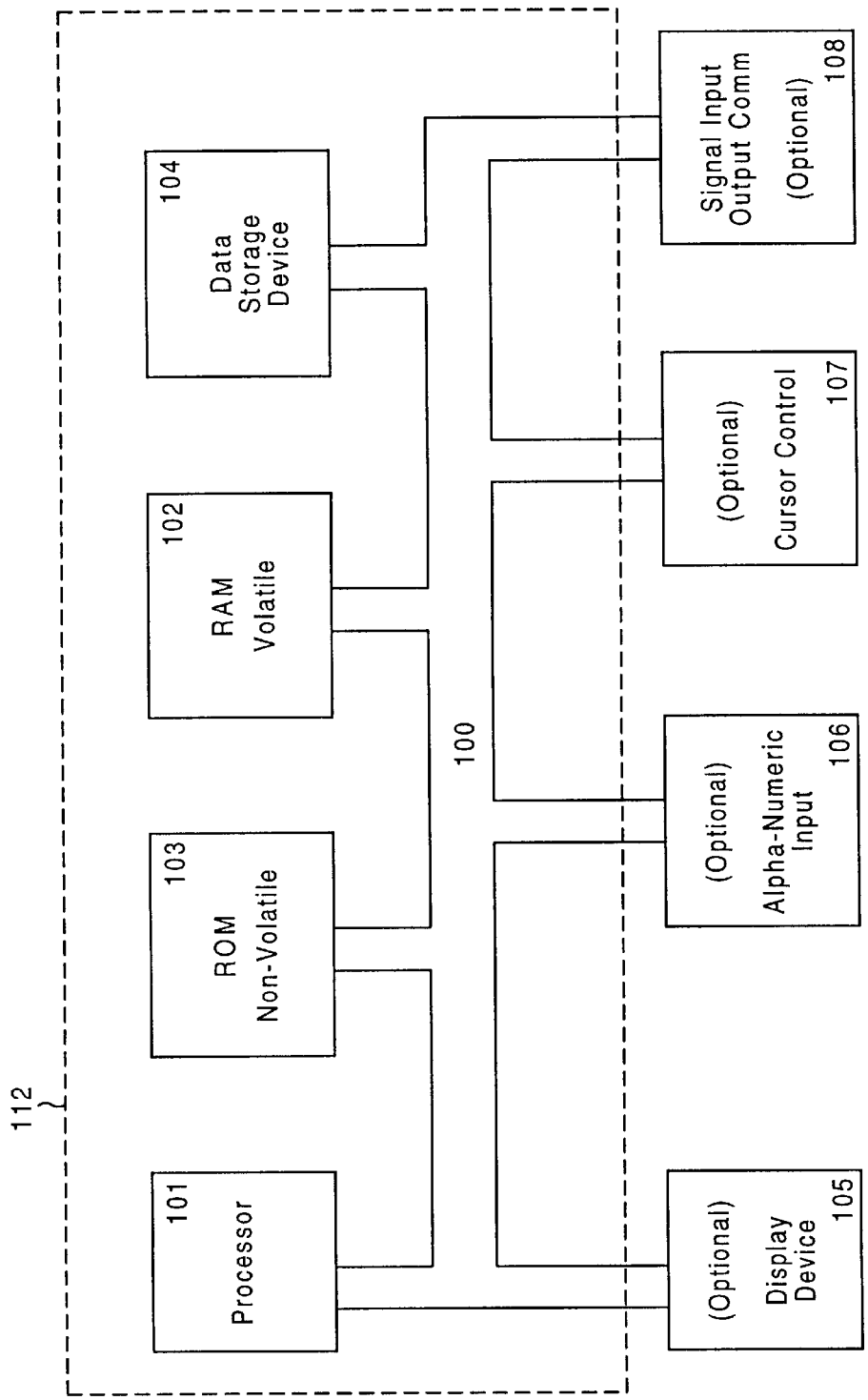
FIG. 2 illustrates a general purpose computer system for implementing the virtual file generation processes of the present invention.

Aspects of the present invention, described below, are discussed in terms of steps executed on a computer system (e.g., process 400, process 414a, process 414b and process 500). Although a variety of different computer systems can be used with the present invention, an exemplary computer system 112 is shown in FIG. 2. In general, computer systems 112 that can be used by the present invention comprise an address/data bus 100 for communicating information, a central processor 101 coupled with the bus for processing information and instructions, a volatile memory 102 (e.g., random access memory) coupled with the bus 100 for storing information and instructions for the central processor 101, a non-volatile memory 103 (e.g., read only memory) coupled with the bus 100 for storing static information and instructions for the processor 101, a data storage device 104 ("disk subsystem") such as a magnetic or optical disk and disk drive coupled with the bus 100 for storing information and instructions, a display device 105 coupled to the bus 100 for displaying information to the computer user, an optional alphanumeric input device 106 including alphanumeric and function keys coupled to the bus 100 for communicating information and command selections to the central processor 101, an optional cursor control device 107 coupled to the bus for communicating user input information and command selections to the central processor 101, and a signal generating device 108 coupled to the bus 100 for interfacing with other networked computer systems. The display device 105 of FIG. 2 utilized with the computer system 112 of the present invention may be a liquid crystal device, cathode ray tube, or other display device suitable for creating graphic images and alphanumeric characters recognizable to the user.

PROCEDURE FOR GENERATING VIRTUAL FILES

Figure 3:
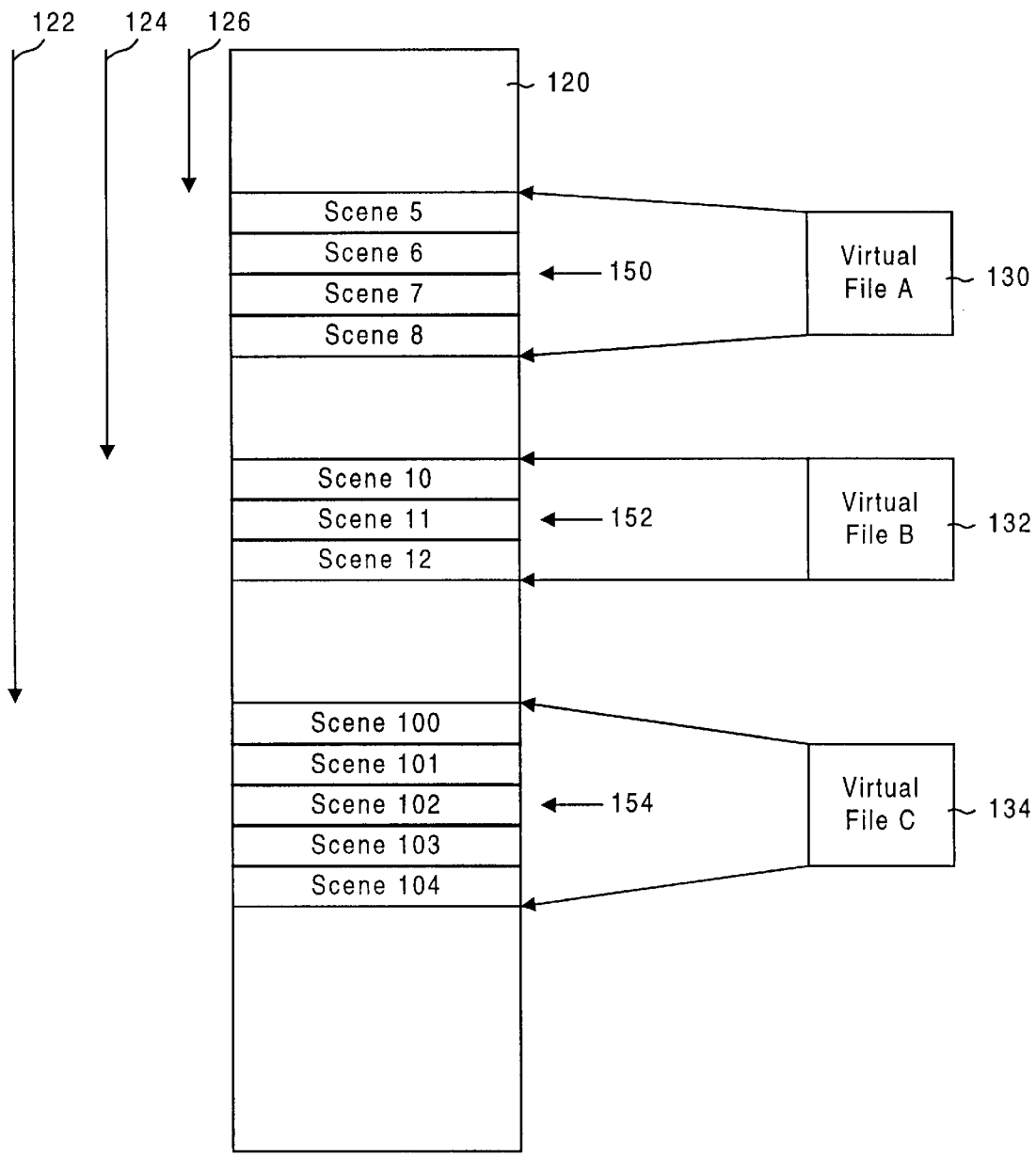
FIG. 3 is a logical illustration of data and groups of data (data portions) within a physical file being assigned to various virtual files in accordance with the present invention.

FIG. 3 illustrates a physical information file ("information file") 120 stored in disk media (e.g., magnetic or optical) in the disk subsystem 104 (FIG. 2). When performing multimedia authoring procedures in a computer system, the physical file 120 is called the "playback unit." The physical file 120 contains several separate individual data (e.g., scene 5, scene 6, scene 7, etc.) and includes several groups of data 150, 152 and 154. The data stored in physical file 120 can be of any type within the scope of the present invention. In one embodiment of the present invention, the data is multimedia data. In the exemplary physical file 120 of FIG. 3, data group 150 includes scenes 1–8, data group 152 includes scenes 10–12 and data group 154 includes scenes 100–104. Data within a data group of a virtual file is logically contiguous (e.g., sequential) within the physical file 120. Each scene includes audio and video data used to construct a scene of a multi-media program. Within the scope of the present invention, the data of the scenes can be recorded in a number of different formats including: the Motion Picture Experts Group (MPEG) format; the Quicktime format; or the Joint Photographic Experts Group (JPEG) format.

In order to share the data within the physical file 120 in a more flexible and efficient manner, the present invention allows a software developer to define "virtual files." Each virtual file is associated with a separate individual data or a group of data within the physical file 120. Herein, separate individual data or a group of data can be a "data portion." Once a virtual file is defined in accordance with the present invention, it can be used by the operating system and by the disk subsystem 104 to access the data portion of the physical file 120 to which the virtual file points. In this manner, the data of the virtual file can be rapidly and efficiently accessed by an application of computer system 112 without the need to search through the physical file 120 for it.

FIG. 3 illustrates three exemplary virtual files: virtual file 130 (virtual file A); virtual file 132 (virtual file B); and virtual file 134 (virtual file C). Virtual file A 130 is defined to incorporate data group 150, virtual file B 132 is defined to incorporate data group 152 and virtual file C 134 is defined to incorporate data group 154. It is appreciated that a virtual file can also be defined that incorporates a single individual data (e.g., a single scene of data). The virtual files 130, 132, and 134 are used by the present invention to efficiently and flexibly access data that resides within the physical file 120. In this context, a virtual file can also be referred to as a logical file in that the virtual file does not contain its own data but rather uses the data of the physical file 120. As discussed to follow, each virtual file is generated by the present invention using a corresponding index file.

Along with each virtual file of FIG. 3 is defined a byte or word offset value from the top reference (e.g., zero) of the physical file 120. The offset value represents the starting byte or word address of the data corresponding to the associated virtual file. For instance, offset 126 corresponds to virtual file A 130, offset 124 corresponds to virtual file B 132, and offset 122 corresponds to virtual file C 134. Each offset 122, 124, 126 is referenced from the top or zero address position at the start of physical file 120. Also defined for each virtual file 130, 132, and 134 is the byte or word size of the virtual file.

Figure 4:
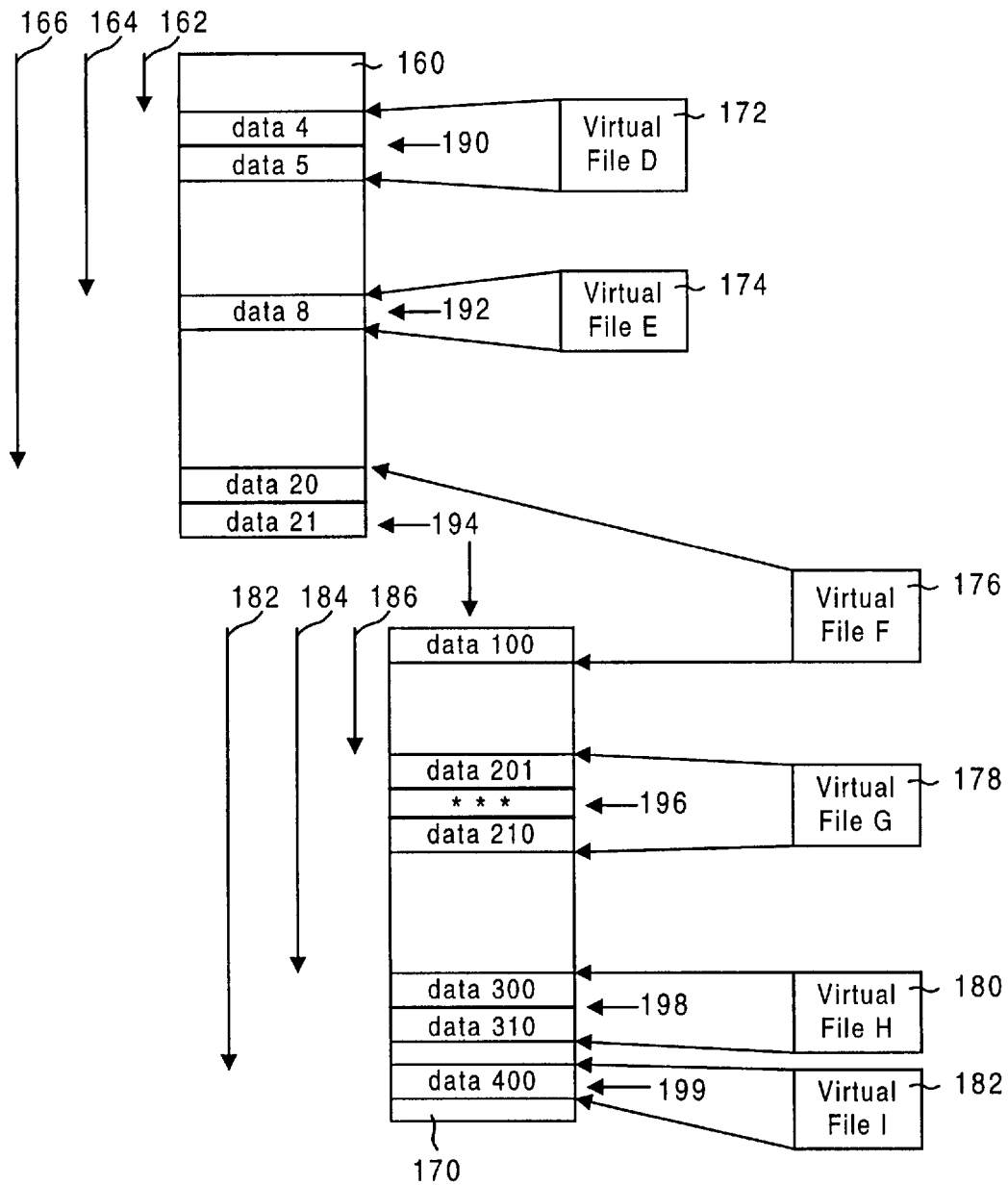
FIG. 4 is a logical illustration of data and groups of data (data portions) within more than one physical file being assigned to various virtual files in accordance with the present invention.

FIG. 4 illustrates flexibility of the virtual files in that virtual files can be assigned across multiples physical files. For instance, physical file 160 and physical file 170 are shown and they are contiguous. Like physical file 120 (FIG. 3), physical files 160 and 170 are each stored in disk media (e.g., optical or magnetic) within the disk subsystem 104 (FIG. 2). Physical file 160 and physical file 170 are each separate playback units. Virtual file D 172 as shown incorporates individual data 4 and also individual data 5 which together form data group 190. Offset 162 from physical file 160 is assigned to virtual file D 172 along with the byte or word size of data group 190. Virtual file E 175 incorporates only a single individual data 8 192 and is associated with offset 164 and the size of data 8 192.

Virtual file F 176 of FIG. 4 spans both physical file 160 and physical file 170. Virtual file F 176 as shown incorporates individual data 20 and individual data 21 of physical file 160 and also individual data 100 of physical file 170 which all together form data group 194. Offset 166 from physical file 160 is assigned to virtual file E 177 along with the byte or word size of data group 194. It is appreciated that physical files 160 and 170 are contiguous. Virtual file G 178 incorporates individual data 201 through individual data 210 which are contiguous data and form data group 196. Offset 186 from physical file 170 is assigned to virtual file G 178 along with the byte or word size of data group 196. Virtual file H 180 incorporates individual data 300 and individual data 301 which are contiguous data and form data group 198. Offset 184 from physical file 170 is assigned to virtual tile H 180 along with the byte or word size of data group 198. Lastly, virtual file I 182 incorporates individual data 400 and includes offset 182 from physical file 170 and the byte or word size of data 400.

Figure 5:
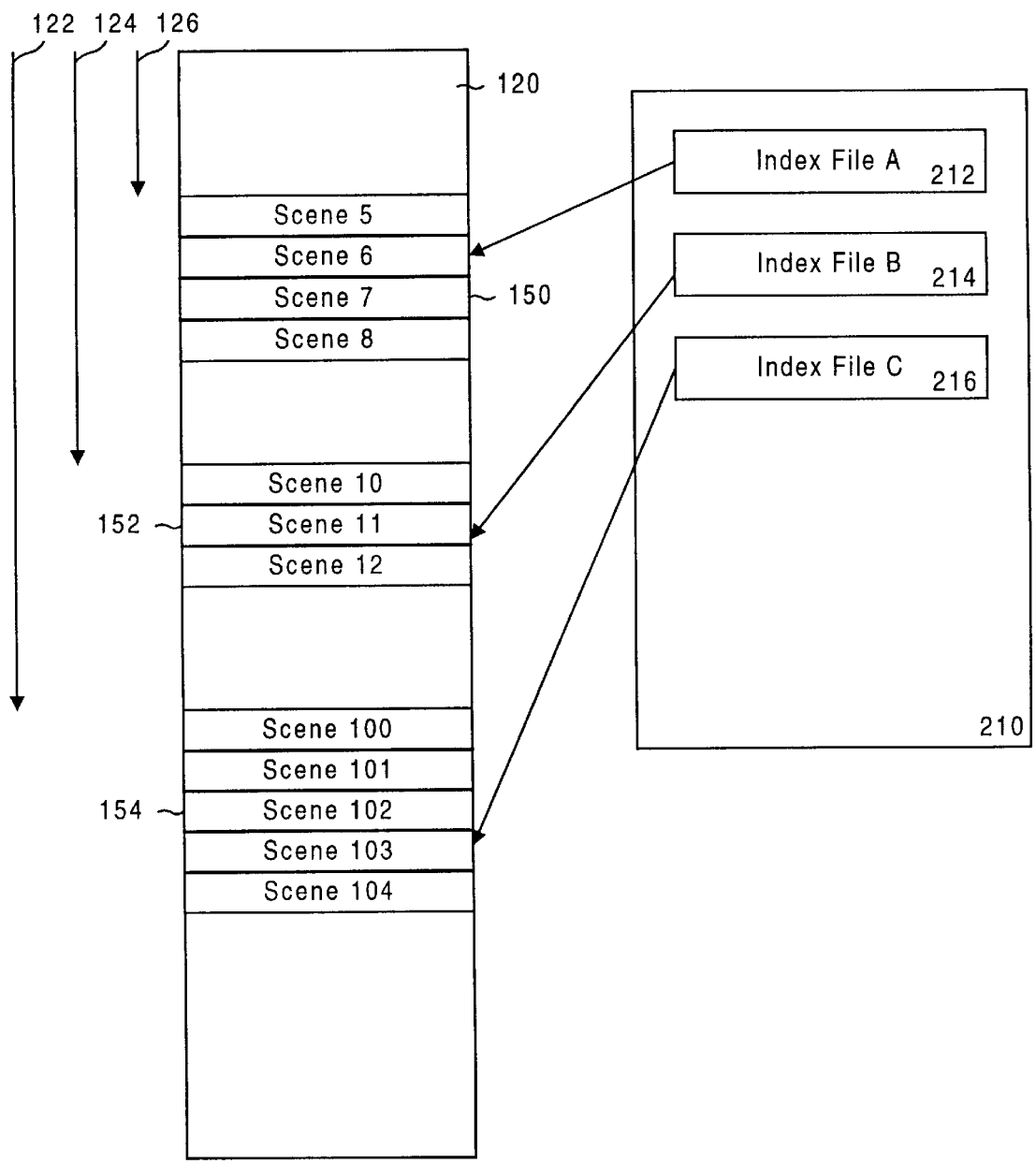
FIG. 5 is an illustration of index files of the present invention being created and assigned to the virtual files of FIG. 3.

FIG. 5 illustrates that the present invention, under computer control of computer system 112, translates the offset and size values described above for each virtual file A–I into a respective index file. An index file is provided for each virtual file. As discussed in more length below, the offset values and the size values for each virtual file are given by the computer user to the present invention for generating the virtual files.

FIG. 5 illustrates the physical file 120 and data groups as discussed in FIG. 3. Virtual file A was defined for data group 150, virtual file B was defined for data group 152 and virtual file C was defined for data group 154. The present invention generates an index file for each virtual file. A main index directory 210 is created within disk subsystem 104 and this main index directory 210 contains all of the index files. For instance, index file A 212 is generated for virtual file A, index file B 214 is generated for virtual file B, and index file C 216 is generated for virtual file C. Each respective index file, stored in disk media, contains the offset value, the size value, the physical file and the file name for the virtual file to be defined. For instance, index file B 214 contains (1) the offset value 124, (2) an indicator of physical file 120 (e.g., its filename), (3) the size of data group 152, and (4) the file name selected by the user for virtual file B. Likewise, index file C 216 contains (1) the offset value 122, (2) an indicator of physical file 120 (e.g., its filename), (3) the size of data group 154, and (4) the file name selected by the user for virtual file C. The index files 212, 214, 216 are generated as a result of a user active session in which the virtual files are defined. The index files 212, 214, 216 are maintained by the disk subsystem 104.

Figure 6:
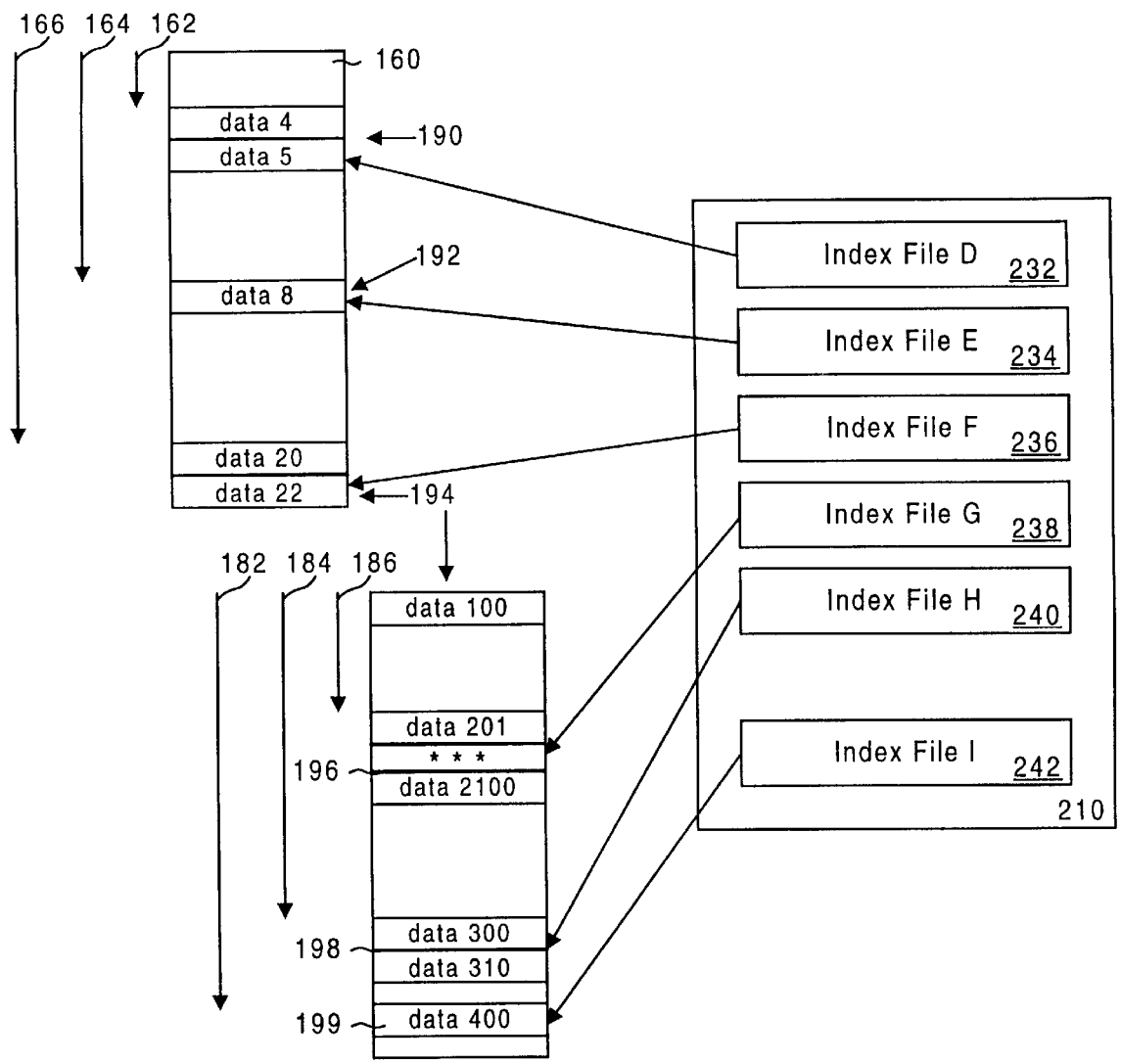
FIG. 6 is an illustration of index files of the present invention being created and assigned to the virtual files of FIG. 4.

FIG. 6 illustrates the index files within the main index directory 210 that correspond to the virtual files defined in FIG. 4. Index file D 232 corresponds to virtual file D, index file E 234 corresponds to virtual file E, index file F 236 corresponds to virtual file F, index file G 238 corresponds to virtual file G, index file H 240 corresponds to virtual file H, and index file 1 242 corresponds to virtual file I. Like the index files A–C, the index files of FIG. 6 each contain the offset value, the size value, the physical file and the file name for the virtual file to be defined. For instance, index file E 234 contains (1) the offset value 164, (2) an indicator of physical file 160 (e.g., its filename), (3) the size of data 192, and (4) the file name selected by the user for virtual file E. Index file F 236 contains (1) the offset value 166, (2) an indicator of physical file 160 (e.g., its filename) starting the data, (3) the size of data group 194, and (4) the file name selected by the user for virtual file F. Index file G 238 contains (1) the offset value 186, (2) an indicator of physical file 170 (e.g., its filename), (3) the size of data group 196, and (4) the file name selected by the user for virtual file G.

Figure 7:
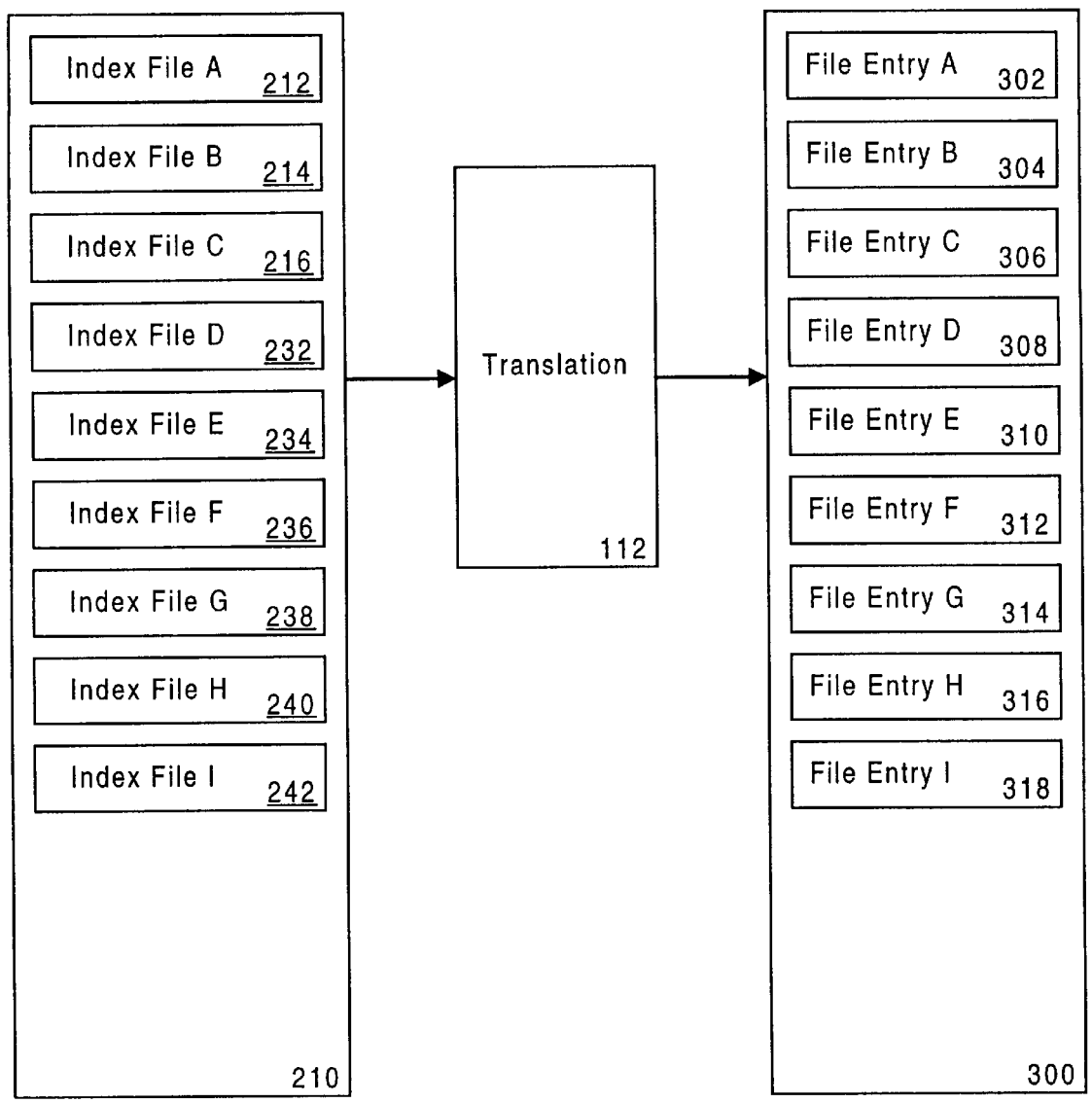
FIG. 7 is a logical diagram illustrating that the respective index files of FIG. 5 and FIG. 6 are translated by the present invention into respective file entries.

FIG. 7 illustrates that the index files 212–242 for virtual files A–I are translated by the computer system 112 into file entries A–I 302–318 in accordance with the present invention. Each index file within the main index directory 210 is translated into a respective file entry of the file entries 300, for instance, index file B 214 is translated into file entry 304 and index file F 236 is translated into file entry F 312, etc. The file entries 300 are used by the operating system of computer system 112 when accessing a particular virtual file. All the information required of a disk file is incorporated into the file entry so that the virtual file can be readily accessed using conventional mechanisms and processes. Therefore, computer system 112 performs a translation of the offset and size values obtained from each index file within directory 210 into disk media location information representing the particular physical location (in the disk media) of the data of a virtual file as stored in disk media within the disk subsystem 104.

Since there are many different types of disk storage standards, different translations can be performed by the present invention so that the file entries 300 are properly generated for the particular storage technique. The translations required for two particular file storage standards, (1) the OSTA Universal Disk Format Specification or UDF standard and (2) the ISO9660 Information Processing—Volume and File Structure of CD-ROM for Information Interchange standard, or ISO standard, are discussed below (FIG. 9B). OSTA stands for Optical Storage Technology Association and ISO stands for International Organization for Standardization. These two standards use contiguous data storage. The translation required for a third data storage standard using non-contiguous data storage is also discussed (FIG. 9C).

Figure 8:
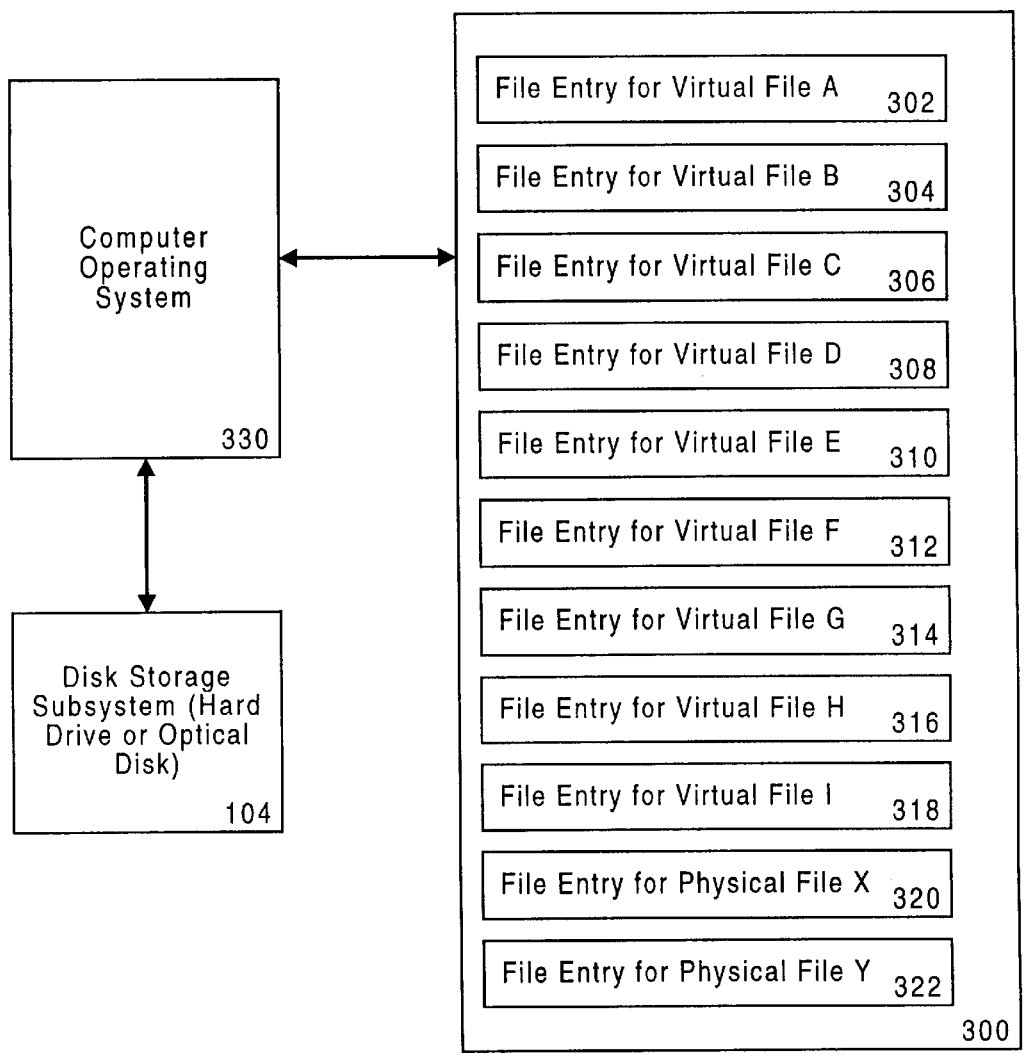
FIG. 8 is a logical block diagram illustrating the interface between the computer operating system, the file entries, and the disk storage subsystem.

As shown in FIG. 8, when a particular virtual file is requested for access by an application executing within computer system 112, the operating system 330 of the computer system 112 uses the file entries 300 to determine the physical location or locations of the data on the disk media within disk subsystem 104 and the data of the virtual file is then accessed and supplied to the application. It is appreciated that the file entries 300 are recorded in the disk media itself within disk subsystem 104 or can be stored in computer readable memory (RAM) 102 or (ROM) 103 of system 112. It is appreciated that the data incorporated within any virtual file of virtual files A–I resides within the physical files (e.g., 120, 160, 170) and the data location information within each of the file entries of FIG. 8 points to the data in the physical files. Data made available to the virtual files A–I is not therefore copied within the scope of the present invention in order to share the data across many files.

FIG. 8 shows that the file entries 300 also include an entry 320 for physical file X (e.g. physical file 160) and also an entry 322 for physical file Y (e.g., physical file 170). The file entry for physical file 120 is not shown. This emphasizes that the file entries 302–318 within 300 that correspond to virtual files are of the same syntax, structure and convention as the file entries used by the operating system to access the physical files 120, 160 and 170. Therefore, no special software or procedures are required by the computer system 112 in order to access the virtual wiles A–I that are generated by the present invention. Therefore, the virtual files of the present invention are compatible with any operating system of any computer system 112 and moreover the native disk access operating system software of computer 112 can be used for accessing the virtual files in accordance with the present invention.

Figure 9A:
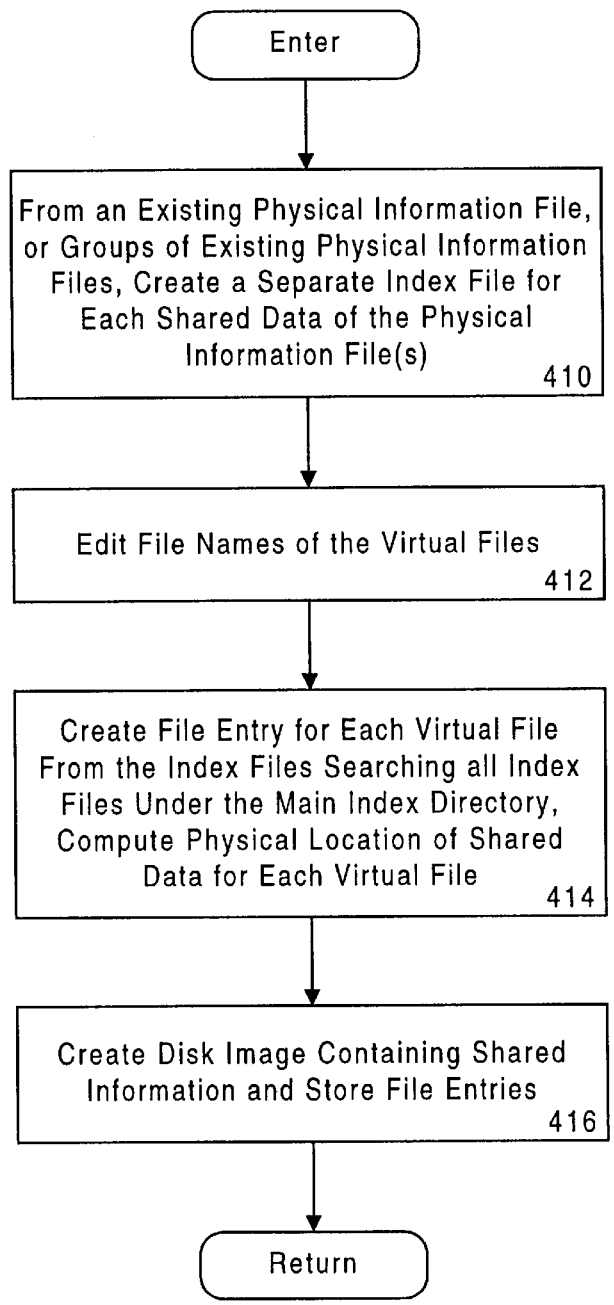
FIG. 9A illustrates a flow diagram of steps performed by the present invention for generating virtual files.
Figure 9B:
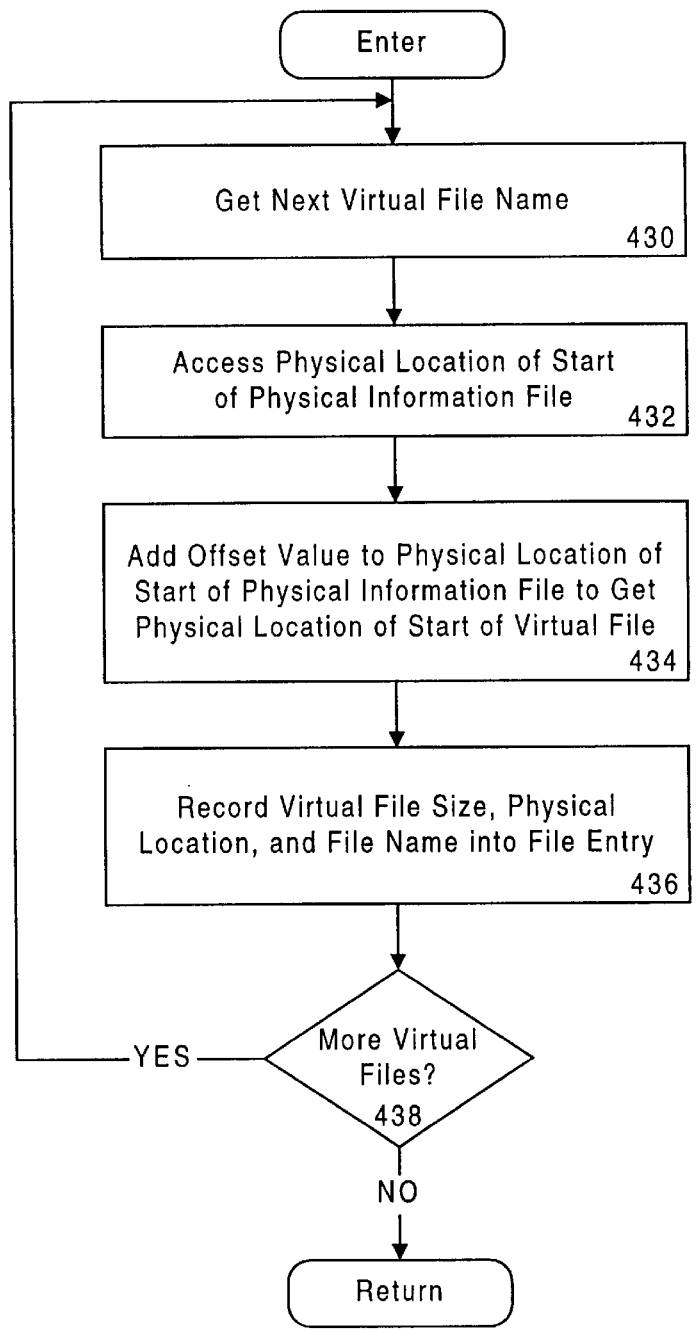
FIG. 9B illustrates a flow diagram of steps performed by the present invention in generating file entries for disk subsystems that store information in a contiguous format.
Figure 9C:
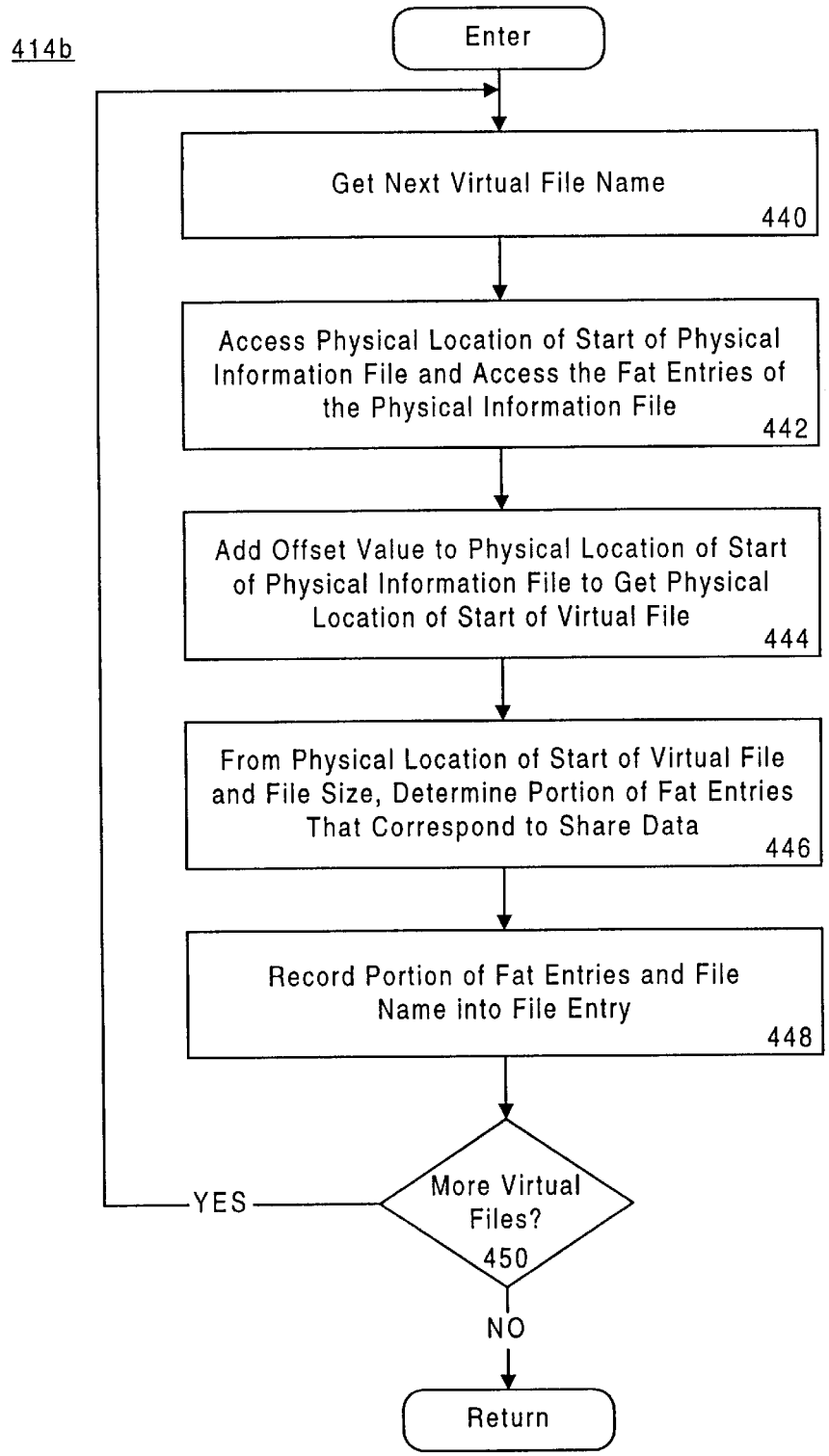
FIG. 9C illustrates a flow diagram of steps performed by the present invention in generating file entries for disk subsystems that store information using entries of a FAT (file access) table.

FIG. 9A illustrates a flow chart 400 of steps executed by computer system 112 for generating virtual files in accordance with the present invention. Process 400 is implemented as a set of instructions stored in computer readable memory units of system 112 and executed over processor 101. At step 410, from an existing physical information file, or from a group of existing physical information files, a separate index file is created in disk media (or in memory)

for each data of the physical information file(s) that is to be shared within a virtual file. At step 410, a user interactive session is established whereby computer system 112 allows a user to input information to generate one or more virtual files. This interactive process accesses a selected physical file so that a user can decide what data or data groups of the physical file are to be shared. More specifically, for each virtual file to be generated, the user inputs (1) a file name, (2) a physical file from which to obtain the shared data, (3) a byte or word offset from the top of the physical file and (4) the size of the shared data.

Once the above data is entered for a particular virtual file, an index file is then generated for the virtual file. It is appreciated that the above information is obtained at step 410 for each virtual file to be generated. It is appreciated further that any of a number of various and well known user interface procedures can be employed in step 410 to obtain the required data from the user including various text and graphic editors and other graphic user interfaces (GUIs) that interact with the physical file in order for the user to readily select those portions of the physical file that are to be shared.

In the case where the data to be shared in multi-media data, the above user provided information typically defines a scene or group of scenes within a audio/visual work (e.g., a movie, a game, a storybook, etc.) and associates this information with a virtual file for subsequent efficient computer access. At step 410, a user is optionally allowed to edit any information regarding a previously defined virtual file. Step 410 terminates upon the user selecting an exit command. At the completion of step 410, several index files reside within main index directory 210 within disk media, one index file for each user defined virtual file.

At step 412 of FIG. 9A, the user is allowed to edit any of the information that was provided by the user in step 410. The user can edit the file names of the virtual files or can edit the offset locations, sizes, etc. Also at step 412, the present invention allows the user to edit the name of the main index directory 210 so that the index files can be placed in a directory position for the user's convenience.

At step 414 of FIG. 9A the computer system 112 is instructed by the present invention to calculate the data required to generate a file entry, for use by the disk subsystem 104, for each user-defined index file that was defined in step 410 and/or modified in step 412. As discussed above, a file entry is used by the operating system 330 (FIG. 8) in accessing data within a recorded file (magnetic or optical) in accordance with file accessing standards (e.g., UDF, ISO, etc.) employed by the disk subsystem 104. At step 414, the computer system 112 computes the physical location (in the disk media) of the data within a virtual file. Specifically, FIG. 9B describes the process 414a used by the present invention at step 414 for determining the information required for the file entries for computer system file accessing standards that record data contiguously within the files. FIG. 9C describes the process 414b used by the present invention at step 414 for determining the information required for the file entries for computer system file accessing standards that do not record data contiguously within the files but rather use file access tables (FATs).

In addition to the physical location of the data of a virtual file, at step 414, the present invention also records into the respective file entry (1) the virtual file's file name, (2) its size and (3) any other information required by the disk subsystem 104 and the operation system 330 for accessing data in a recorded file. Step 414 searches through all of the index files located within a selected main index directory 210 to generate all of the file entries 302–318 (FIG. 7) for all of the virtual files represented within the main index directory 210.

At step 416 of FIG. 9A, the present invention then creates a disk image (optical or magnetic) containing the shared information of the virtual files and the physical file(s) and stores the generated file entries 302–318 in the disk media as well.

FIG. 9B describes the process 414a used by the present invention at step 414 for determining the information required for generating the file entries that are used by computer system file accessing standards that record data contiguously within the files. At step 430, the present invention obtains a virtual file name from the main index directory 210. In effect, a particular index file of the main index directory 210 is selected at step 430 and the selected index file contains a particular or selected file name representing a selected virtual file to be generated. At step 432, the present invention then accesses the physical information file that is associated with the selected index file and then accesses the physical location (logical sector number) in the disk media at which the physical file starts. This information can be obtained from the file entry for the physical file that is maintained by the disk subsystem 104 and/or the operating system 330.

At step 434, the present invention then obtains the physical location (logical sector number) of the shared data associated with the selected virtual file by adding the offset value associated with the selected index file to the physical location of the physical file obtained from step 432. The value determined at step 434 represents the physical location on the disk media (e.g., its logical sector location also called sector number) at which the data incorporated by the selected virtual file commences. The process 414a is used by recording formats that use contiguous data. Therefore, with the physical location and the size of the virtual file, the disk subsystem 104 can access the shared data.

At step 436 of FIG. 9B, the present invention creates a file entry by recording the file name of the selected virtual file, its size in bytes or words (logical sector size), and its physical location (logical sector number) on disk media as determined at step 434. This generated file entry is generated for this virtual file corresponding to the selected index file. At the completion of step 436, the computer system 112 generates a respective file entry for a respective index file. At step 438, the computer system 112 checks if any more index files need processing that are located within the main index directory 210. If not, then process 414a returns. If so, then at step 438, process 414a returns to process 430 to process the next index file to generate another file entry.

FIG. 9C describes the process 414a used by the present invention at step 414 for determining the information required for generating the file entries that are used by computer system file accessing standards that do not record data contiguously within the files. In this file format, a file access table (FAT) is used which contains multiple entries to define the physical location of a single file. In these recording standards, the data for a single file can be spread over many physical disk sectors and discontiguous location on the disk media. The FAT entries define the sector locations that comprise a single file.

At step 440 of FIG. 9C, the present invention obtains a virtual file name from the main index directory 210. In effect, a particular index file of the main index directory 210 is selected at step 440 and the selected index file contains a particular or selected file name representing a selected virtual file to be generated. At step 442, the present invention next accesses the physical location (sector number) in the disk media of where the physical file starts that is associated with the selected index file. The present invention next accesses the FAT entries that correspond to the physical file associated with the selected index file. The FAT entries are maintained by the disk subsystem 104 and/or by the operating system 330. Techniques for accessing the FAT entries of a physical file are well known in the art and any of these well known methods can be used at step 442.

At step 444, the present invention adds the offset value of the selected index file to the physical location of the physical file (obtained at step 442) to obtain the physical location of the shared data associated with the selected index file (e.g., the selected virtual file). At step 446, using the physical location of the virtual file and the size of the virtual file (obtained from the selected index file), the present invention determines that portion of the FAT entries (obtained at step 442) that correspond to the data of the virtual file. This portion of the FAT entries corresponds to the physical locations (logical sector numbers) of the shared data that constitute the virtual file.

At step 448 of FIG. 9C, the present invention generates a file entry corresponding to the selected index file by recording (1) the portion of the FAT entries determined at step 446, (2) the file size, (3) and the file name of the virtual file. At the completion of step 448, the computer system 112 generates a respective file entry for a respective index file. At step 450, the computer system 112 checks if any more index files need processing that are located within the main index directory 210. If not, then process 414b returns. If so, then at step 450, process 414b returns to process 440 to process the next index file to generate another file entry.

It is appreciated that in one embodiment of the present invention, the physical file having shared data therein can be stored in a non-volatile disk storage media, e.g., an optical disk media, and the file entries generated by the present invention can be stored in another type of non-volatile disk media, e.g., a magnetic disk storage, or vice-versa.

Figure 10:
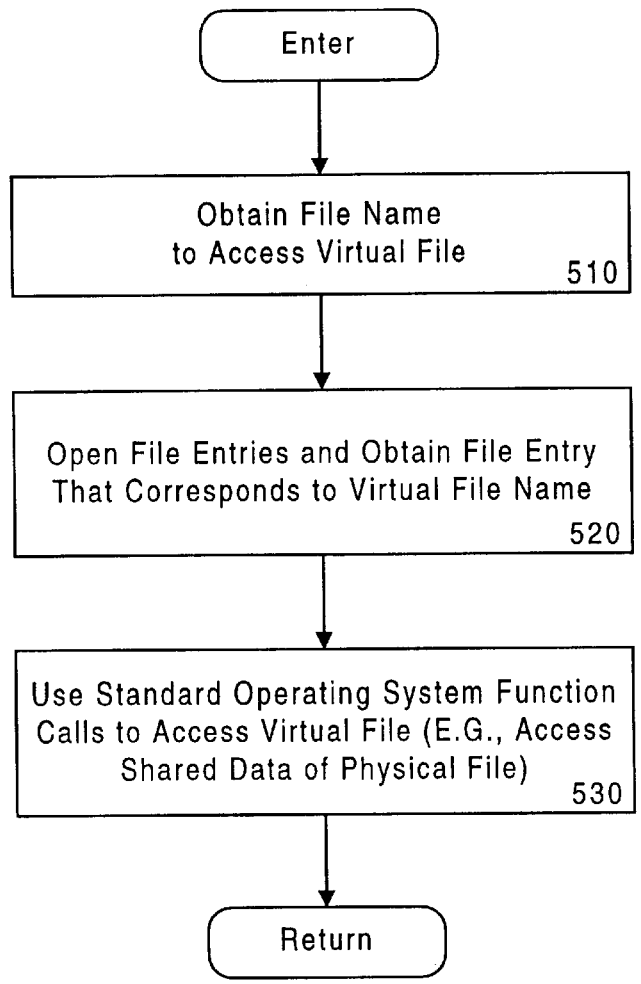
FIG. 10 illustrates a flow diagram of steps performed by the computer system using virtual files of the present invention to access shared data.

FIG. 10 illustrates a flow diagram of process 500 illustrating a method of accessing shared data within a virtual file generated by the present invention. Process 500 is implemented as a set of instructions stored in computer readable memory units of system 112 and executed over processor 101. As discussed above, once the present invention generates the file entries for a group of virtual files, the procedure for accessing a virtual file is conventional and depends only on the type of file access standard employed by the computer system 112. FIG. 10 illustrates one such conventional file access method. At step 510, the operating system 330 (FIG. 8) receives a request to access a virtual file. The request includes the name of the virtual file. At step 520, the present invention opens the file entries 300 and searches the entries until a record with a matching file name is obtained. At step 530, the computer system 112 uses conventional operating system functions to obtain the shared data of the virtual file from the associated physical file or files. The computer system 112 uses the physical location information (e.g., FAT entries or logical sector number and file size) to obtain the shared data.

It is appreciated that the present invention's use of virtual files to access data within a physical file is advantageous because it eliminates the searching required of the prior art mechanisms to locate a particular data or group of data within a physical file. Instead, the physical location of the data or group of data associated with a virtual file is known a priori and is stored in the file entry corresponding to the virtual file. When this shared data portion is requested by an application, the computer system 112 can directly obtain the data and incorporate the data into an application as requested by the user, without inefficient searching procedures of the prior art. This is especially advantageous in the field of user interactive multi-media authoring applications ("storybooks") where scenes of data are constantly accessed from the physical file. Virtual files within the computer system 112 can be generated by the user and these virtual files incorporate the required scenes of data and these scenes can be accessed quickly and flexibly using the present invention.

The preferred embodiment of the present invention, an efficient and flexible mechanism for sharing data and groups of data within a physical file using virtual files, is described. While the present invention has been described in particular embodiments, it should be appreciated that the present invention should not be construed as limited by such embodiments, but rather construed according to the below claims.

What is claimed is:

1. In a computer system having a disk subsystem for accessing data stored on a disk media, a computer implemented method of sharing data of said disk media, said method comprising the steps of:

a) receiving a user-selected data portion of a physical information file, said data portion to be shared by a virtual file and defined by an address offset value from the top of said physical information file, the size of said shared data portion and a user-selected file name for said shared data portion;

b) generating a respective index file in said disk media for said shared data portion, step b) comprising the steps of:

b1) writing said offset value, said size and said file name of said shared data portion into said respective index file; and b2) writing an indication of said physical information file into said respective index file;

c) creating a plurality of respective index files by performing steps a) and b) for a plurality of respective shared data portions of said physical information file; and d) creating a respective virtual file for each respective index file by generating a respective file entry for each respective index file, step d) comprising the steps of:

d1) translating said offset value of each respective index file into a physical location in said disk media of said shared data portion of each respective index file, wherein said disk subsystem records data contiguously within said physical information file and wherein step d1) comprises the steps of: determining a physical location of said top of said physical information file of said respective index file; and adding to said physical location of said top of said physical information file said offset value of said respective index file to obtain said physical location of said shared data portion of said respective index file; and d2) recording said physical location of said shared data portion and said file name of each respective index file into said respective file entry, wherein steps d1) and d2) are repeated for each respective index file.

2. A method as described in claim 1 wherein said physical location of said top of said physical information file is described by a first logical sector number and wherein said physical location of said shared data portion of said respective index file is described by a second logical sector number.

3. A method as described in claim 1 wherein said physical information file comprises a plurality of audio and video data signals recorded therein for generating a plurality of scenes of a multi-media work and wherein said shared data portion comprises one or more of said plurality of scenes.

4. A method as described in claim 1 wherein said disk media is magnetic media and wherein said disk subsystem is a magnetic disk subsystem.

5. A method as described in claim 1 wherein said disk media is optical media and wherein said disk subsystem is an optical disk subsystem.

6. A computer system having a processor coupled to a bus, a memory unit coupled to said bus and a disk subsystem coupled to said bus for accessing data stored on a disk media, said memory unit having instructions stored therein that when executed cause said computer system to implement a method of sharing data of said disk media, said method comprising the steps of:
   a) receiving a user-selected data portion of a physical information file, said data portion to be shared by a virtual file and defined by an address offset value from the top of said physical information file, the size of said shared data portion and a user-selected file name for said shared data portion;
   b) generating a respective index file in said disk media for said shared data portion, step b) comprising the steps of:
      b1) writing said offset value, said size and said file name of said shared data portion into said respective index file; and
      b2) writing an indication of said physical information file into said respective index file;
   c) creating a plurality of respective index files by performing steps a) and b) for a plurality of respective shared data portions of said physical information file; and
   d) creating a respective virtual file for each respective index file by generating a respective file entry for each respective index file, step d) comprising the steps of:
      d1) translating said offset value of each respective index file into a physical location in said disk media of said shared data portion of each respective index file, wherein said disk subsystem does not record data contiguously within said physical information file wherein said location of said physical information file is described by FAT entries and wherein step d1) comprises the steps of: determining a physical location of said top of said physical information file of said respective index file; using said physical location of said top of said physical information file and said offset value of said respective index file, determining a portion of said FAT entries of said physical information file that describe the physical location of said shared data portion; and returning said portion of said FAT entries as said physical location of said shared data portion of said respective index file; and
      d2) recording said physical location of said shared data portion and said file name of each respective index file into said respective file entry, wherein steps d1) and d2) are repeated for each respective index file.

7. A computer system as described in claim 6 wherein said physical information file comprises a plurality of audio and video data signals recorded therein for generating a plurality of scenes of a multi-media work and wherein said shared data portion comprises one or more of said plurality of scenes.

8. A computer system as described in claim 6 wherein said disk media is magnetic media and wherein said disk subsystem is a magnetic disk subsystem.

9. A computer system as described in claim 6 wherein said disk media is optical media and wherein said disk subsystem is an optical disk subsystem.

10. In a computer system having a disk subsystem for accessing data stored on a disk media, a computer implemented method of sharing data of said disk media comprising the steps of:
    a) receiving a user-selected data portion spread between first and second physical information files, said data portion to be shared and defined by an address offset value from the top of said first physical information file, the size of said shared data portion and a user-selected file name for said shared data portion;
    b) generating a respective index file in said disk media for said shared data portion, said step b) comprising the steps of:
       b1) writing said offset value, said size and said file name of said shared data portion into said respective index file; and
       b2) writing an indication of said first physical information file into said respective index file;
    c) creating a plurality of respective index files by performing steps a) and b) for a plurality of shared data portions; and
    d) creating a respective virtual file for each respective index file by generating a respective file entry for each respective index file, step d) comprising the steps of:
       d1) translating said offset value of said respective index file into a physical location of said shared data portion of said respective index file in said disk media, wherein said disk subsystem records data contiguously within said first physical information file and wherein said step d1) comprises the steps of: determining a physical location of said top of said first physical information file of said respective index file; and adding to said physical location of said top of said first physical information file said offset value of said respective index file to obtain said physical location of said shared data portion of said respective index file; and
       d2) recording said physical location of said shared data portion and said file name of said respective index file into said respective file entry, wherein steps d1) and d2) are repeated for each respective index file.

11. A method as described in claim 10 wherein said physical location of said top of said first physical information file is described by a first logical sector number and wherein said physical location of said shared data portion of said respective index file is described by a second logical sector number.

12. A method as described in claim 10 wherein said first and second physical information files comprise a plurality of audio and video data signals recorded therein for generating a plurality of scenes of a multi-media work and wherein said shared data portion comprises one or more of said plurality of scenes.

13. A method as described in claim 10 wherein said disk media is magnetic media and wherein said disk subsystem is a magnetic disk subsystem.

14. A method as described in claim 10 wherein said disk media is optical media and wherein said disk subsystem is an optical disk subsystem.

15. In a computer system having a disk subsystem for accessing data stored on a disk media, a computer implemented method of sharing data of said disk media comprising the steps of:
- a) receiving a user-selected data portion spread between first and second physical information files, said data portion to be shared and defined by an address offset value from the top of said first physical information file, the size of said shared data portion and a user-selected file name for said shared data portion wherein said first and second physical information files comprise a plurality of audio and video data signals recorded therein for generating a plurality of scenes of a multi-media work and wherein said shared data portion comprises one or more of said plurality of scenes;
- b) generating a respective index file in said disk media for said shared data portion, said step b) comprising the steps of:
  - b1) writing said offset value, said size and said file name of said shared data portion into said respective index file; and
  - b2) writing an indication of said first physical information file into said respective index file;
- c) creating a plurality of respective index files by performing steps a) and b) for a plurality of shared data portions; and
- d) creating a respective virtual file for each respective index file by generating a respective file entry for each respective index file, step d) comprising the steps of:
  - d1) translating said offset value of said respective index file into a physical location of said shared data portion of said respective index file in said disk media, wherein said disk subsystem records data contiguously within said first physical information file and; and
  - d2) recording said physical location of said shared data portion and said file name of said respective index file into said respective file entry, wherein steps d1) and d2) are repeated for each respective index file.

* * * * *